United States Patent Office 2,755,284
Patented July 17, 1956

2,755,284

PROCESS FOR THE MANUFACTURE OF PYRIDOXAL PHOSPHATE

Robert Frank Long, Welwyn Garden City, England, assignor to Hoffmann-La Roche Inc., Nutley, N. J., a corporation of New Jersey No Drawing. Application January 28, 1955,
Serial No. 484,856

Claims priority, application Great Britain
February 3, 1954

6 Claims. (Cl. 260—297)

The present invention relates to a process for the manufacture of pyridoxal phosphate.

Pyridoxal phosphate, which has the following formula

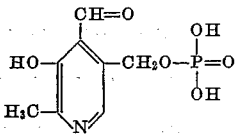

is of importance as it forms a component of certain enzymes; for example, the transaminases. Hitherto it has not been possible to prepare it with a high degree of purity.

According to the present invention, pyridoxal phosphate is prepared in a substantially pure form by treating an aqueous solution of alkali-metal salts of pyridoxamine phosphate and pyruvic acid (or a substituted pyruvic acid) with a cupric, iron, nickel or cobalt salt, passing the reaction mixture through a cationic exchange resin and eluting the pyridoxal phosphate from the latter with water.

For every mol of pyridoxamine phosphate, from one to two (preferably two) mols of pyruvic acid or substituted pyruvic acid and $1/n$ mols of the cupric, iron, nickel, or cobalt salt should best be used ($n$ being the number of atoms of the metal in the particular metal salt chosen), whereupon sufficient alkali is need to form the necessary alkali-metal salts (3 to 4 equivalents).

The process should preferably be conducted in an inert atmosphere, for example, in nitrogen. It is advisable to exclude light as the formation of impurities is thereby minimized. The preferred cationic exchange resin is that marketed under the trade name of Amberlite IR 120 or Amberlite IR 112 and is used in the free acid form.

As substituted pyruvic acids which may be used in practising the present invention may be mentioned those pyruvic acids containing as a substitutent an electrophilic radical or an alkyl, aryl or aralkyl group, each of which groups may contain an electrophilic substituent such as, for example, a carboxyl or acetyl group.

The salts of copper, iron, cobalt and nickel for use in the process must be soluble in water or in the reaction mixture. Examples of preferred salts are copper acetate, ferric ammonium sulphate, cobalt nitrate and nickel nitrate.

The completion of the reaction may be determined by irradiating the reaction mixture with ultra-violet light. When the absorption spectrum indicates that the amount of the pyridoxal phosphate in the reaction mixture is no longer increasing, the mixture is then passed through the cationic exchange resin. The elution of the exchange resin can similarly be followed by irradiation of fractions of the eluate with ultra-violet light and the appropriate selection made so as to obtain the aforesaid substantially pure product.

The working up of the eluate can be effected by evaporation to small bulk, whereupon the product crystallizes out. Alternatively, the product can be precipitated from concentrated aqueous solutions with acetone. Other precipitants (for example, ethanol), can also be used.

In order that the invention may be more clearly understood and readily carried into effect, the following examples are given.

*Example 1*

0.248 g. (0.001 mol) Pyridoxamine phosphate and 0.088 g. (0.001 mol) pyruvic acid were dissolved in 25 cc. air-free water, 3 cc. aqueous N NaOH was added and the solution treated with an aqueous cupric sulphate solution (M; 0.5 cc.). The solution was then allowed to stand for 72 hours under nitrogen. It was filtered and passed through a column of Amberlite IR 120 sulphonic acid resin which was then washed with air-free water. By measuring the ultra-violet absorption spectrum of effluent, fractions containing the pyridoxal phosphate in a pure state were selected. Evaporation of the aqueous solution to small volume and precipitation with acetone gave, as determined by paper chromatography, pyridoxal phosphate (in the form of its internal salt) in a substantially pure state. Ultraviolet absorption maxima:

$$E_1^1 \text{ at } 325 m\mu = 90$$

and $$E_1^1 \text{ at } 387\text{-}389 m\mu = 200$$

in aqueous solution at pH 6. It can be converted into its crystalline oxime (M. P. 228–230° C.) in an 80% yield.

*Example 2*

0.5 g. (0.002 mol) Pyridoxamine phosphate was mixed with 0.6 g. α-keto-glutaric acid (0.004 mol) in 20 cc. of distilled water. 1.2 cc. of N sodium hydroxide (0.012 mol) were added followed by 10 cc. of a fifth molar solution of copper acetate. The water used for preparing these solutions was oxygen-free. The reaction mixture was allowed to stand at room temperature for two hours in a nitrogen atmosphere and worked up by passing it through a column of sulphonic acid ion exchange resin from which the air had been removed by washing with air-free water. Elution was carried out with air-free water and from the appropriate fraction of the eluate 0.360 g. pyridoxal phosphate (70% of theoretical yield) was isolated by evaporation to small bulk under reduced pressure in a nitrogen atmosphere.

*Example 3*

0.5 g. Pyridoxamine phosphate (0.002 mol) was mixed with 0.4 g. α-keto-butyric acid (0.004 mol) in 20 cc. of distilled water and 8 cc. of N sodium hydroxide (0.008 mol) were added followed by 10 cc. of a fifth molar solution of copper acetate. The water used for preparing these solutions was oxygen-free. The reaction mixture was allowed to stand at room temperature for 60 hours in a nitrogen atmosphere and worked up by passing it through a column of sulphonic acid ion exchange resin from which the air had been removed by washing with air-free water. Elution was carried out with air-free water and from the appropriate fraction of the eluate 0.210 g. of pyridoxal phosphate (40% of theoretical yield) was isolated by evaporation to small bulk under reduced pressure in a nitrogen atmosphere.

*Example 4*

5.1 g. (0.02 mol) Pyridoxamine phosphate hemihydrate was suspended in 50 cc. water and 20 cc. sodium hydroxide solution (2–N solution, 0.04 mol) followed by 20 cc. sodium pyruvate solution (2–M solution, 0.04 mol) were then added. An aqueous solution of 100 cc. copper acetate (M/5 solution, 0.02 mol) was then added with shaking and the resulting dark green solution diluted (to approximately 300 cc.). All water used in making up this solution was air-free and the mixing was carried out under nitrogen.

After standing at ca. 20° C. for 1 hour, the solution was put through a column (3.5 cms. x 30 cms.) of sulphonic acid ion exchange resin in the acid state which had previously been washed with ca. 2000 cc. of air-free water. Elution was carried out with oxygen-free water at 150–160 cc./hour and the eluate collected in fractions (100 cc. each) under nitrogen. The ultraviolet absorption of each fraction was measured at 320 m$\mu$ and 387 m$\mu$ and those in which $E_{387\,m\mu}/E_{320\,m\mu}=2.4\pm0.1$ were mixed (2100 cc.) and evaporated under reduced pressure in a nitrogen atmosphere to small bulk (50 cc.). On standing for 24 hours at 0° C. pyridoxal phosphate monohydrate crystallized out. The mother liquors were also concentrated to small bulk (ca. 10 cc.) to yield a second crop of identical material. Yields of ca. 78% (4.1 g.) were obtainable.

*Example 5*

To a suspension of 10 g. pyridoxamine phosphate dihydrate in 50 cc. water was added a normal aqueous solution of 60 cc. sodium hydroxide followed by a molar solution of 70 cc. sodium pyruvate. The resulting solution was stirred under nitrogen while a quarter molar aqueous solution of copper acetate (140 cc.) was added over the period of five minutes. The dark green solution was allowed to stand at ca. 20° C. for an hour and a quarter and then added to a column of sulphonic acid cation exchange resin (2000 g.) in the acid state at 400 cc./hour. Six more identical solutions were made up at twenty minute intervals and added successively to the column, which latter was then eluted with distilled water. From that part of the eluate containing pure pyridoxal phosphate, as indicated by its ultraviolet absorption spectrum, there was obtained on concentration under reduced pressure pyridoxal phosphate monohydrate (39 g.).

All aqueous solutions and the distilled water were oxygen-free and all operations were conducted in a nitrogen atmosphere and in the dark.

*Example 6*

The procedure of Example 5 was repeated except that ferric ammonium sulphate solution (3.5 cc. of M/2 solution) was used instead of the copper acetate solution. From 500 mg. of pyridoxamine phosphate dihydrate, a solution containing 163 mg. of pyridoxal phosphate monohydrate was obtained.

*Example 7*

The procedure of Example 5 was repeated except that a cobalt nitrate solution (3.5 cc. of M/2 solution) was used instead of copper acetate solution. From 500 mg. of pyridoxamine phosphate dihydrate a solution containing 292 mg. of pyridoxal phosphate monohydrate was obtained.

*Example 8*

The procedure of Example 5 was repeated except that a nickel nitrate solution (3.5 cc. of M/2 solution) was used instead of the copper acetate solution. From 500 mg. of pyridoxamine phosphate dihydrate a solution containing 313 mg. of pyridoxal phosphate was obtained.

I claim:

1. A process for the production of pyridoxal phosphate which comprises treating an aqueous solution of an alkali metal salt of pyridoxamine phosphate and a pyruvic acid with a soluble salt of the group consisting of cupric, iron, nickel and cobalt salts, passing the reaction mixture through a sulphonic acid cation exchange resin in the acid state and eluting pyridoxal phosphate therefrom with water.

2. A process as in claim 1 wherein the salt is a cupric salt.

3. A process as in claim 1 wherein the salt is copper acetate.

4. A process as in claim 1 wherein the salt is used in a molecular proportion of 1:1 to 2:1/$n$, $n$ representing the number of atoms of metal in the metal salt used.

5. A process as in claim 1 wherein the process is conducted in an inert atmosphere and in the absence of light.

6. A process for the production of pyridoxal phosphate which comprises treating an aqueous solution of an alkali metal salt of pyridoxamine phosphate and pyruvic acid with copper acetate, passing the reaction mixture through a sulphonic acid cation exchange resin in the acid state and eluting pyridoxal phosphate therefrom with water.

References Cited in the file of this patent

UNITED STATES PATENTS

| | | |
|---|---|---|
| 2,497,732 | Hoffman | Feb. 14, 1950 |
| 2,666,061 | Harris et al. | Jan. 12, 1954 |
| 2,703,323 | Karrer et al. | Mar. 1, 1955 |

OTHER REFERENCES

Nachod: "Ion Exchange" (Academic Press), p. 1 (1949).

Kunin: "Ion Exchange Resins" (Wiley) pp. 1–4 (1950).